United States Patent [19]

Andrew

[11] Patent Number: 4,936,092
[45] Date of Patent: Jun. 26, 1990

[54] PROPELLANT GRAIN DESIGN

[75] Inventor: James W. Andrew, Salt Lake City, Utah

[73] Assignee: The United States of America as represented by the Secretary of the Navy, Washington, D.C.

[21] Appl. No.: 276,992

[22] Filed: Nov. 28, 1988

[51] Int. Cl.$^5$ ............................................. F02K 9/28
[52] U.S. Cl. ...................................... 60/245; 60/250; 60/253
[58] Field of Search ................. 60/250, 253, 254, 244, 60/245; 102/290, 291

[56] References Cited

U.S. PATENT DOCUMENTS

| | | | |
|---|---|---|---|
| 3,088,273 | 5/1963 | Adelman et al. | 60/253 |
| 3,427,805 | 2/1969 | Osburn | 60/253 |
| 3,889,463 | 6/1975 | San Miguel | 102/290 |
| 3,908,364 | 9/1975 | LeFebvre et al. | 102/290 |
| 3,916,618 | 11/1975 | Araki et al. | 102/290 |
| 3,985,592 | 10/1976 | Hackett et al. | 102/290 |
| 4,663,065 | 5/1987 | Herring | 60/253 |
| 4,686,823 | 8/1987 | Coburn et al. | 60/39.32 |
| 4,711,086 | 12/1987 | Offe et al. | 60/253 |

FOREIGN PATENT DOCUMENTS 1107513 3/1968 United Kingdom ................. 60/253

OTHER PUBLICATIONS

"Research and Development of Materiel," *Ballistic Missile Series Propulsion and Propellants*, HQ US Army Materiel Command, Aug. 30, 1963, pp. 22-24, AMCP 706-282.

Primary Examiner—Louis J. Casaregola
Assistant Examiner—Timothy S. Thorpe
Attorney, Agent, or Firm—Harold M. Dixon; Robert M. Wohlfarth; Charles D. B. Curry

[57] ABSTRACT

A solid propellant rocket motor propellant grain configuration having a center bore of a varying diameter, ballistic slots, a stress/ballistic groove, and a burn inhibitor band for withstanding service motor operating environments and providing the required ballistic profile.

5 Claims, 5 Drawing Sheets

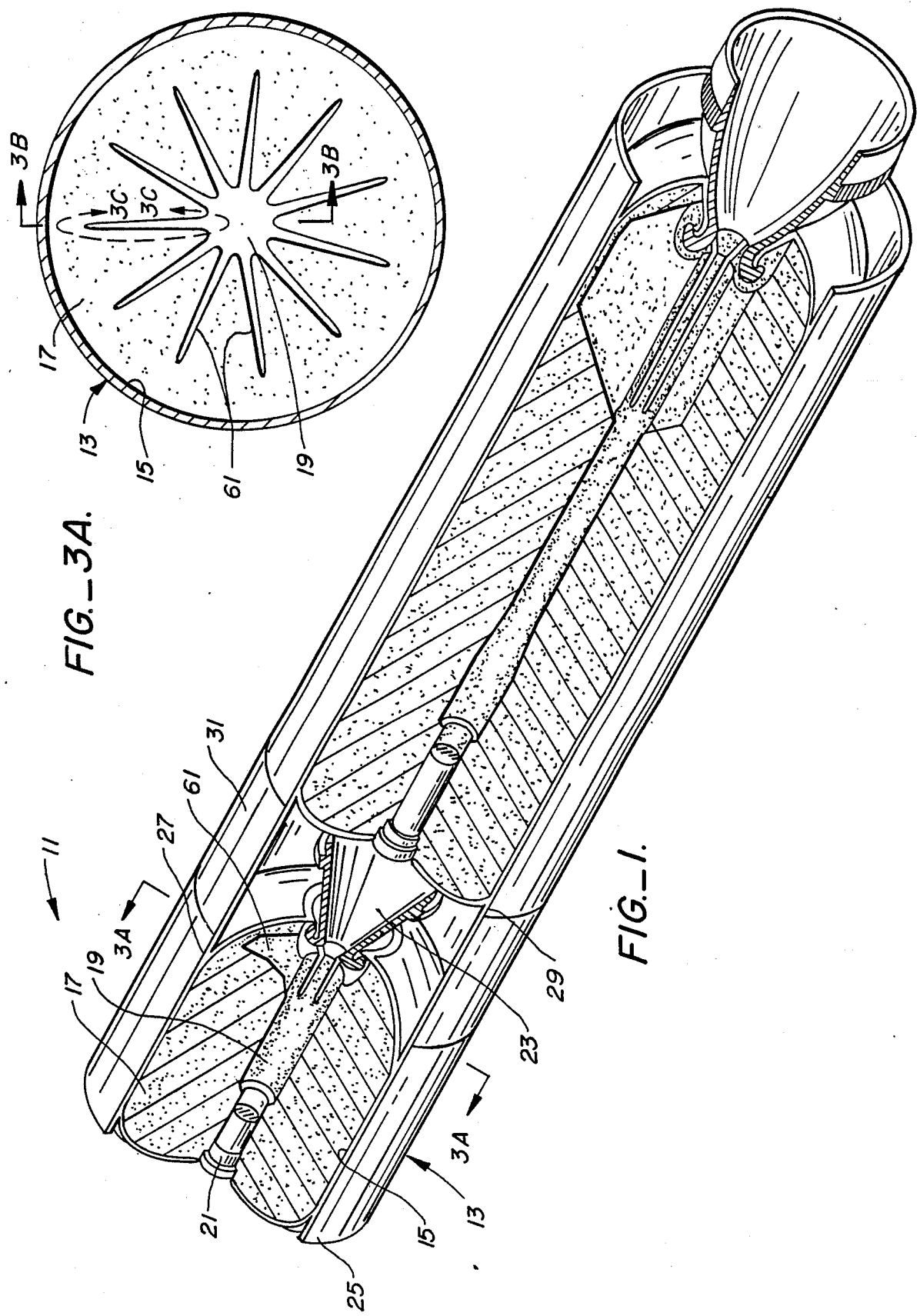

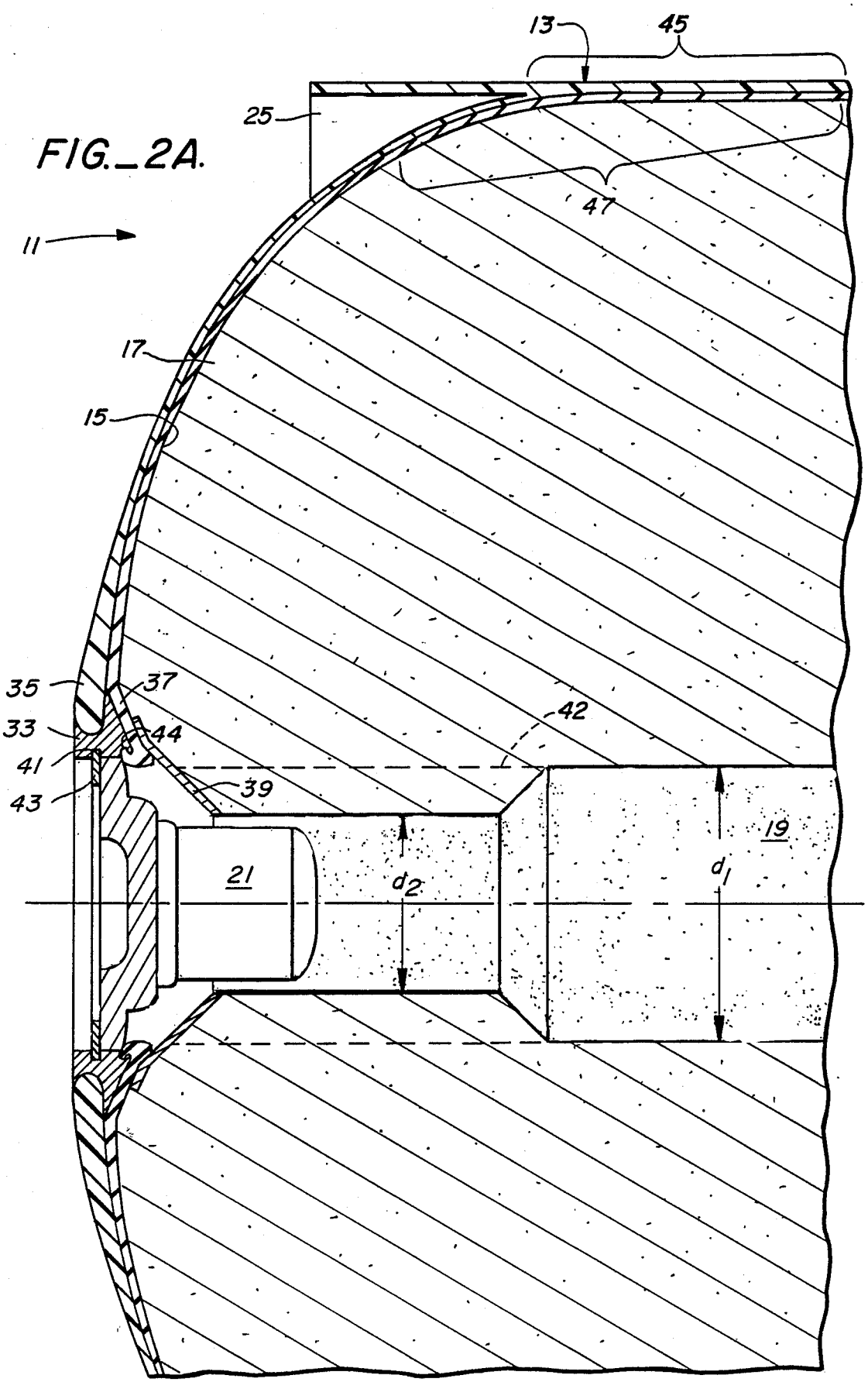
FIG._2A.

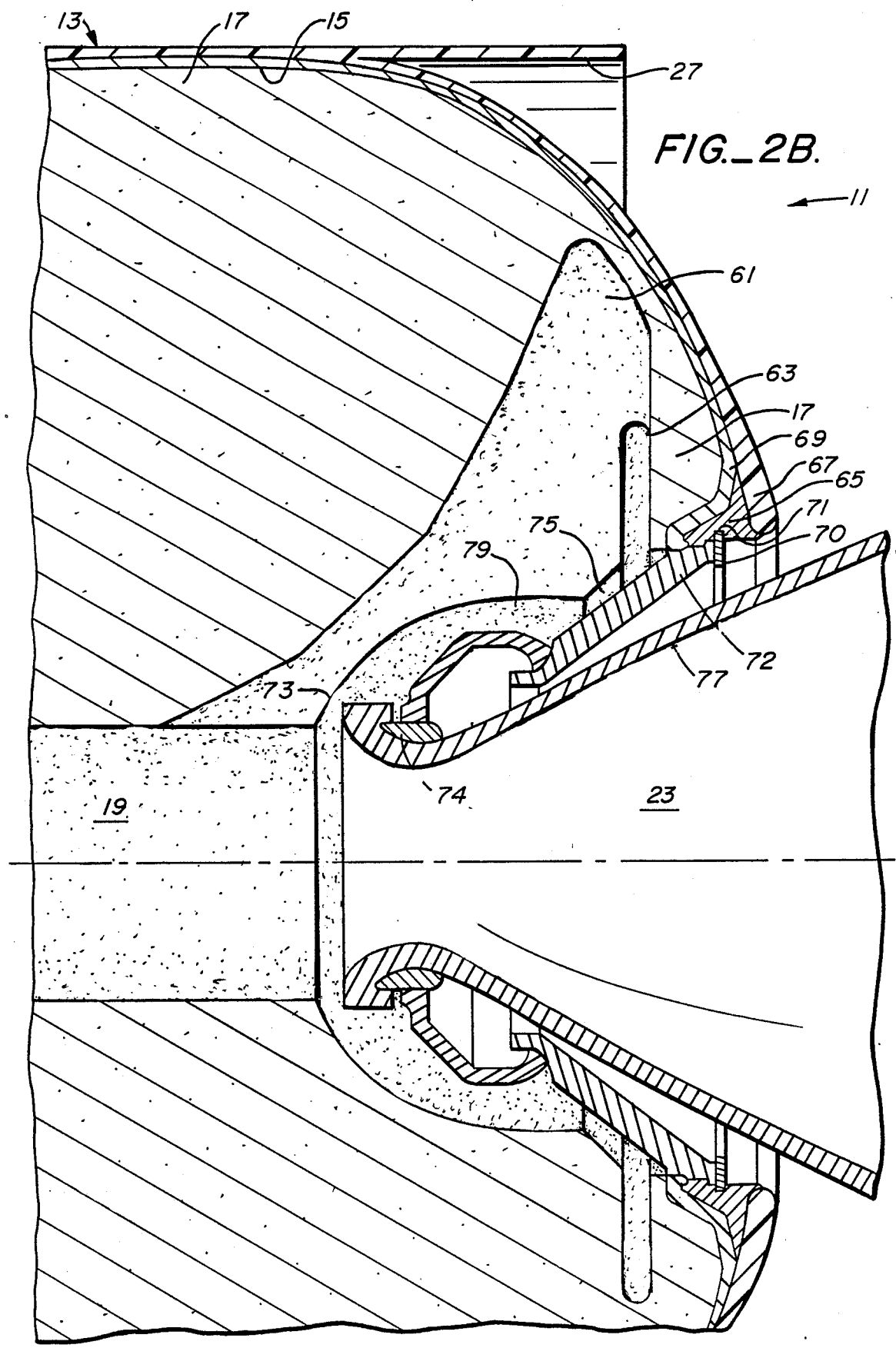
FIG._2B.

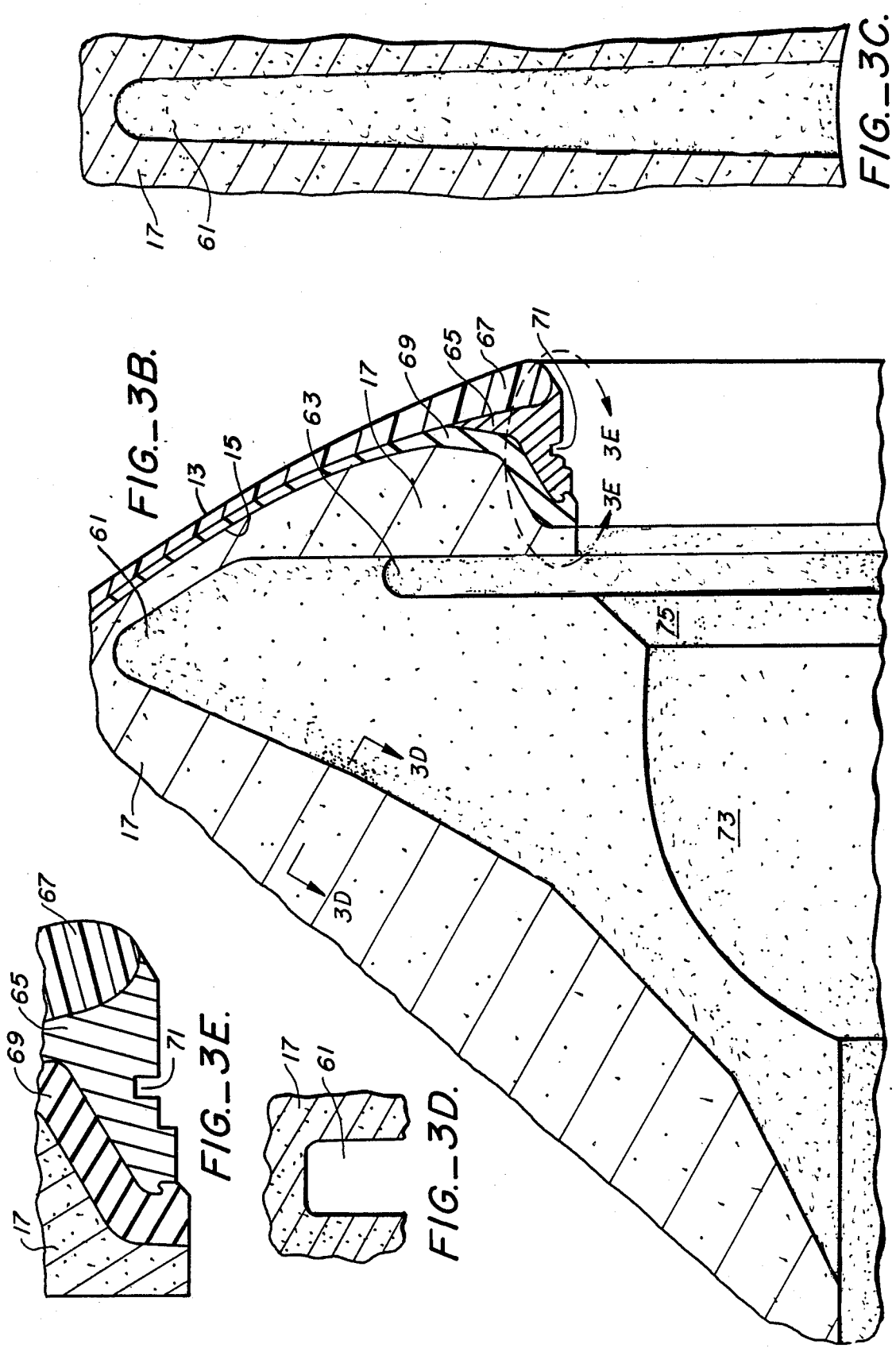

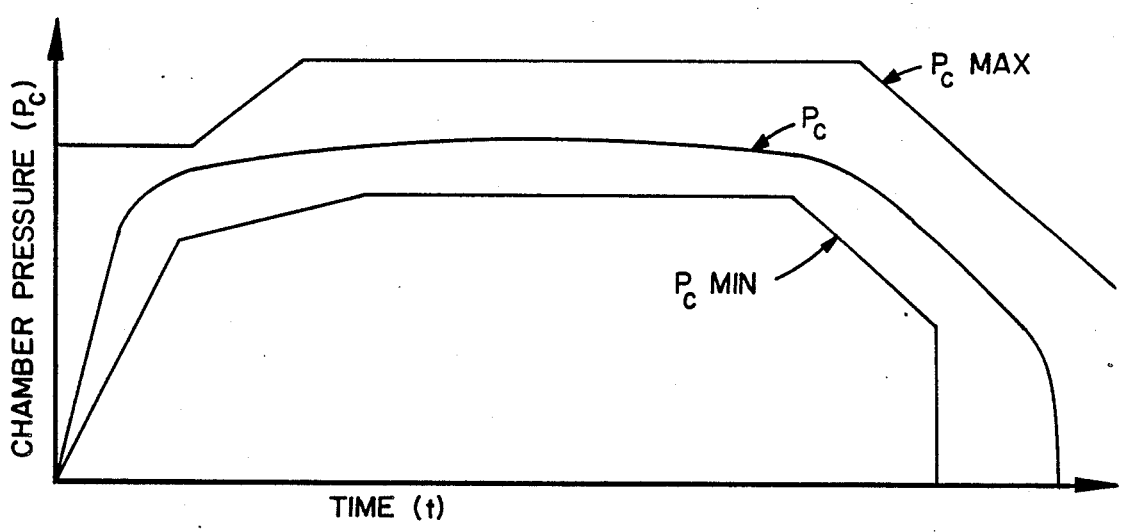
FIG._4.
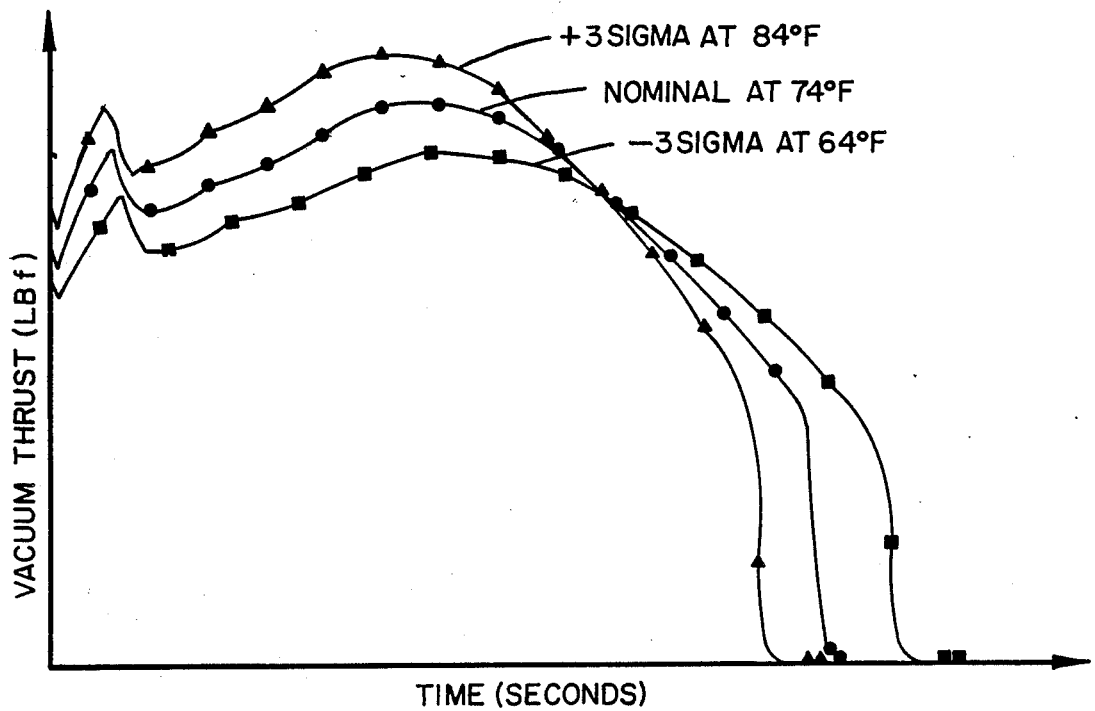
FIG._5.

PROPELLANT GRAIN DESIGN

BACKGROUND OF THE INVENTION

1. Field of the Invention

The present invention relates to rocket motors and more particularly, but without limitation thereto, to the propellant grain design for use in solid propellant rocket motors.

2. Description of the Prior Art

Because of increased performance requirements relating to thrust, thrust duration, size and efficiency, there is the continuing search for new techniques for improved rocket motors and corresponding ballistic missile performance. Prior art techniques have not provided the high performance required for advanced weapon systems that must undergo severe operating environments of high thrust, high propellant density, high operating pressures, high accelerations, and high operating temperatures. These and other effects have been accommodated by the rocket motor grain design of the present invention.

SUMMARY OF THE INVENTION

An object of the present invention is to provide a solid propellant grain design wherein the propellant is cast and configured inside the rocket motor chamber so as to withstand the severe motor operating environment and produce the required ballistic profile.

Another object of the present invention is to provide a solid propellant motor grain design that produces high thrust, high operating pressure, high operating temperatures, high acceleration and which operates efficiently, reliably and with optimum safety.

These and other objects have been demonstrated by the present invention for use in a loaded rocket motor including a chamber, an internal insulator, adapters, a propellant inhibitor and the propellant grain. Unique features of the propellant grain, which cooperates with the motor, are the center bore design, ballistic fin slots, and a stress relief groove. Optionally, a forward stress relief flap may be incorporated to further enhance reliability.

The general manufacturing steps for casting the solid propellant in the rocket motor consist of pre-mixing the liquid ingredients, mixing liquid and solid ingredients, and casting the propellant against an embedded granule-/adhesive that is coating the insulator.

The shape, size, position and number of ballistic fin slots, center bore, and the stress relief groove are used to tailor the ballistic performance of the motor. In the preferred embodiment there are 11 fin slots that extended longitudinally and radially. These fin slots are spaced apart and satisfy the ballistic and structural requirements of the motor. The structural requirements control the shape of the outboard edge of the slots. The stress relief groove reduces the discontinuity stress at the case bond interface so that the propellant maintains its structural integrity. This groove is also tailored ballistically to increase the burn surface and reduce the initial post-ignition pressure. The propellant is a relatively soft, low-strength material which is bonded to a relatively soft rubbery insulator which is in turn bonded to a stiff, high-strength case.

When the motor is ignited, the propellant is consumed by burning the solid material into hot gases which escape through the nozzle. The propellant contains its own fuel and oxidizers plus several other ingredients to increase the thrust output and to control the effects of aging. As the propellant burns, the internal dimensions of the propellant grain are increased due to the pressure load enlarging the case and to the burning phenomenon. Temperature and acceleration loads also deform the propellant grain and affect the structural integrity of the grain and the case bond system. All of these potentially damaging operating characteristics are accommodated by the propellant grain design of the present invention. The invention will be described in further detail with reference to the accompanying drawings, wherein:

BRIEF DESCRIPTION OF THE DRAWINGS

FIG. 1 is an overall pictorial view of the first and second stages of a missile including the loaded second stage of the solid propellant rocket motor of the present invention;

FIG. 2A is a sectional view of the front and rear sections of the rocket motor and propellant grain of the present invention;

FIG. 2B is an enlarged sectional view of the rear end of the rocket motor showing the interrelationship of the chamber, insulator, adapter ring, nozzle and propellant.

FIG. 3A is a reduced end sectional view of the motor and grain of FIGS. 1 and 2, and shows the circumferential features of the major fin slots of the rocket motor propellant grain of the present invention;

FIG. 3B is a side elevation sectional view taken at 3B—3B of FIG. 3A that show the axial and radial features of the major fin slots of the rocket motor propellant grain;

FIG. 3C is a sectional view of the end of the major fin slot taken at view 3C of FIG. 3B;

FIG. 3D is a sectional view of the root of the major fin slot taken at view 3D of FIG. 3B;

FIG. 3E is a sectional view of the chamber, insulator, and adapter ring assemblage taken at 3E—3E of FIG. 3B.

FIG. 4 are curves showing maximum, minimum, and actual rocket motor chamber pressures as a function of time.

FIG. 5 are curves showing the effects of temperature on vacuum thrust during the burn time of the missile.

DESCRIPTION OF THE PREFERRED EMBODIMENT

In FIG. 1 is an overall pictorial view of the first and second stages of a missile including the loaded second stage rocket motor 11 of the present invention. The loaded second stage rocket motor shown in FIGS. 1 and 2 A and B include chamber 13, insulator 15, propellant grain 17, propellant center bore 19, igniter 21, nozzle 23, front skirt 25, and rear skirt 27. Interconnecting first stage front skirt 29 and second stage rear skirt 27 is interstage cylinder 31 which forms an interstage chamber which contains the second stage nozzle 23, the first stage igniter, firing mechanisms and other devices, not shown, essential to the operation of the first and second stages. It should be noted that the first stage motor includes a front skirt 29, and other devices essential to the operation of the first and second stages. Forward of second stage 11 of the missile are various other missile components, not shown, such as a third stage, equipment section, re-entry bodies, and a nose section.

As best shown in FIG. 2, the second stage rocket motor 11 also includes front adapter ring 33, enlarged front chamber section 35, enlarged front insulator section 37, and propellant burn inhibitor band 39. The adapter ring 33 is positioned between chamber section 35 and insulator section 37 and includes a snap ring groove 41 that contains a snap ring 43 that retains the igniter 21 in position. Front adapter ring 33 also includes a notch 44 that retains insulator section 37 in position.

The purpose of the inhibitor band 39 and the reduction in center bore 19 is to increase the final burn surface which would otherwise exist due to the shortness of the motor. Normally diameter $d_1$ would be constant as shown by the broken line 42, and would result in a final burn area as shown by brackets 45, resulting in an undesirable low final pressure. By providing the inhibition and the reduced diameter $d_2$, the final burn area is as shown by brackets 47, which accomplishes close to a doubling of area.

In FIGS. 2B and 3B are shown the rear end of the rocket motor and propellant grain 17. The grain includes fin slots 61 and ballistic grove 63 which are positioned and have the configuration as illustrated. Also provided in propellant grain 17 is nozzle cut-out section 73 and stress relief groove 75. The nozzle entrance and throat sections 77 is positioned within nozzle cut-out section 73 and leaves cavity 79 for nozzle movement and gas flow. The major fin slot 61 provides more area for the initial high pressure surge in the early stages of the rocket ignition. The ballistic grove 63 provides stress relief and also serves to increase the burn surface.

Adapter ring 65 is provided between the enlarged chamber built-up region 67 and the enlarged insulator region 69. As best shown in FIG. 3E, the adapter ring 65 has a snap ring grove 71 to hold the stationary shell 72 in position with snap ring 70. The nozzle entrance and throat section 77 is mounted on the stationary shell 72 by means of a flex seal 74 which allows the nozzle to rotate and provide for thrust vectoring. The mechanism for locking the insulation to the adapter ring 65 is that of locking the end of enlarged insulation region 69 in place by a lip that is formed in adapter ring 65. The stress relief groove 75 is included to reduce the propellant case bond loads by transferring the high load point into the propellant and away from the case bond between the propellant and the insulator.

In FIG. 4 are shown the pressure verses time curves that are also an indication of thrust or force. The $P_{c\,max}$ pressure curve represents the maximum allowable motor pressure as primarily determined by the mechanical strength of the rocket motor. The $P_{c\,min}$ pressure curve represents the minimum allowable motor pressure that is principally determined by minimum missile performance requirements. $P_c$ is the actual or desired chamber pressure which one of a family of allowable curves between $P_{c\,max}$ and $P_{c\,min}$. The chamber pressure $P_c$ is defined by the relationship:

$$P_c = \frac{S_b o r}{A_t C_D}$$

where:
$P_c$ = chamber pressure
$S_b$ = burning surface of the propellant
o = propellant density
r = propellant burning rate
$A_t$ = throat area of the nozzle
$C_D$ = flow factor It should be noted that the only significant variable in this relationship is the burning surface $S_b$. Therefore, to provide the required pressure curve ($P_c$) the propellant burning area $S_b$ must vary as a function of time. This is achieved by the proper selection of the initial void geometry of the propellant grain as the center bore, major slots and minor slots as herein described.

This invention has been described in detail with particular reference to a certain preferred embodiment, but it will be understood that variations and modifications can be effected within the spirit and scope of the invention.

What is claimed is:

1. A rocket motor comprising:
   (a) a case which includes a cylindrical chamber having hemispherical front and rear ends wherein said hemispherical front end has a centrally located front opening and said hemispherical rear end has a centrally located rear opening;
   (b) a propellant grain positioned within, against and bonded by means of an insulator to the interior surface of said chamber and said grain includes a longitudinal bore that extends from said front opening to said rear opening; and
   (c) said longitudinal bore has a reduced center bore segment at the forward end to provide a ratio of diameters that in turn provides an increased final burn area which is greater than the area provided by a constant diameter bore in the forward section, and the rearmost portion being a cavity larger than the immediately preceding forwardly bore adjacent to said cavity, said cavity being adapted to receive a nozzle and associated flexible seal means between the nozzle and said hemispherical rear end, said cavity being fluidly connected at the rearmost periphery to an annular stress relief groove at it inner periphery;
   (d) a plurality of longitudinal fin slots located at the rear section of said grain and extending radially outward from said bore;
   (e) a ballistic groove which is an annular recess into the central and rearmost part of the grain and fin slots for providing increased burn surface area, said ballistic groove being fluidly connected by its innermost periphery to the outermost periphery of said stress relief groove, whereby said nozzle cavity, said stress relief groove and said ballistic groove are not only fluidly connected over their entire respective peripheries but are serially spaced along the longitudinal axis of said propellant grain bore in an annular concentric orientation.

2. The motor of claim 1 including 11 longitudinal fin slots.

3. The motor of claim 1, wherein the propellant grain at the forward end of the motor is provided with a propellant burn inhibitor band.

4. The motor of claim 1, wherein an insulator is positioned between the interior surface of said chamber and the exterior surface of said propellant grain.

5. A rocket motor according to claim 1 wherein the diameters of the center bore at the forward end to the adjacent section immediately rearward is such that the final burn area is approximately twice that provided by a constant diameter bore in the forward section of the grain.

* * * * *